July 22, 1969  F. ABE ET AL  3,456,310
APPARATUS FOR STOPPING TEXTILE MACHINERY UPON DETECTION OF
YARN-BREAK AND FOR INDICATING LOCATION THEREOF
Filed Sept. 30, 1966  6 Sheets-Sheet 2

INVENTORS
FUJIO ABE
JOHN V. CAUTHEN
DANIEL W. McCOY

BY
Cushman, Darby & Cushman
ATTORNEYS

INVENTORS
FUJIO ABE
JOHN V. CAUTHEN
DANIEL W. McCOY

BY
ATTORNEYS

Fig. 6

United States Patent Office 3,456,310
Patented July 22, 1969

3,456,310
APPARATUS FOR STOPPING TEXTILE MACHINERY UPON DETECTION OF YARN-BREAK AND FOR INDICATING LOCATION THEREOF
Fujio Abe and John V. Cauthen, Fayetteville, and Daniel W. McCoy, Monroe, N.C., assignors to Burlington Industries Inc., Greensboro, N.C., a corporation of Delaware
Filed Sept. 30, 1966, Ser. No. 583,391
Int. Cl. D03d 51/30, 51/28; D02h 13/08
U.S. Cl. 28—51                    20 Claims

ABSTRACT OF THE DISCLOSURE

An apparatus for stopping textile machinery upon detection of a yarn-break and for indicating the location of the break wherein electronic detecting means are disposed immediately adjacent the plurality of yarn sources, where yarn breaks most frequently occur, and wherein the apparatus includes a plurality of means for indicating where the break occurred and means for stopping the machinery in response to the detection of a yarn-break.

This invention relates to apparatus for stopping textile machinery where the machinery simultaneously processes a plurality of strands of yarn, the machinery being stopped whenever one of the strands of yarn breaks. And, in particular, this invention relates to apparatus, as above mentioned, where the machinery is stopped almost instaneously after the yarn breakage, the apparatus being positioned close to the point of frequent yarn breakage and equipped with indicators to direct the warper tender or operator to the broken end of the yarn.

Thus it is a primary purpose of this invention to provide an improved apparatus for stopping textile machinery, such as a warper whenever a yarn breakage occurs, the apparatus substantially reducing the time required by prior art apparatus to locate the broken end and to rethread the ends for splicing.

A further primary purpose of this invention is to reduce the amount of time that the machine is not in operation and thereby increase yarn production.

A further object of this invention is to provide apparatus for stopping textile machinery such as a warper at practically the instant the yarn break occurs.

A further object of this invention is to provide apparatus for facilitating the location of a broken end of yarn in the textile machinery.

Another object of this invention is to provide improved apparatus for detecting a yarn break in textile machinery, the sensitivity of the apparatus being increased albeit the machinery operates in areas of high humidity and dust content.

A further object of this invention is to provide improved apparatus for detecting yarn breaks in textile machinery, the apparatus eliminating the sparking and burning of the wires and electrodes necessary to detect the yarn break by employing an electric relay such as an SCR.

A further object of this invention is to provide an apparatus for stopping textile machinery whenever a yarn breakage occurs, the apparatus being inactivated for a predetermined interval of time following each restart of the machinery.

Other objects and advantages of this invention will become apparent upon reading the appended claims in conjunction with the following detailed description and the attached drawings, in which:

Figure 1:
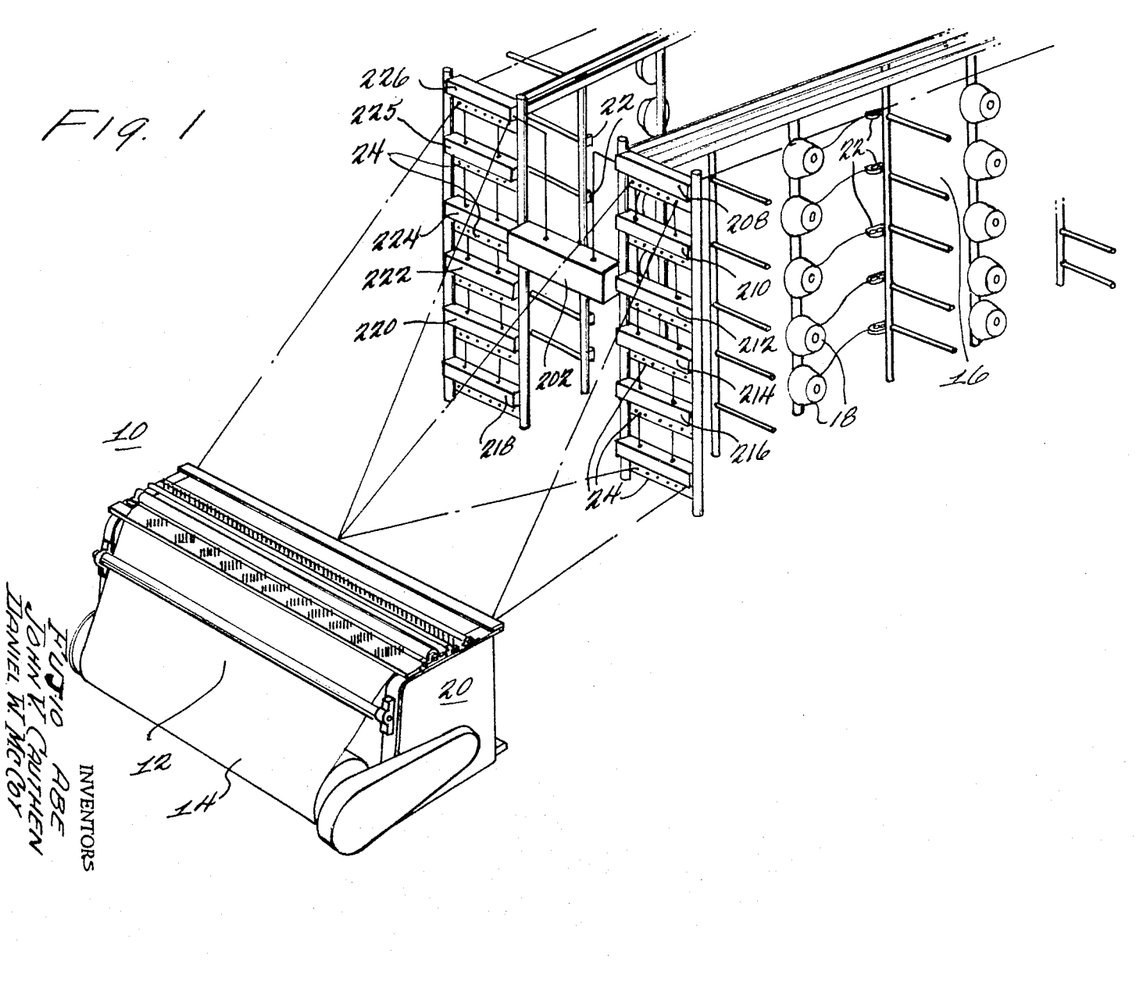
FIGURE 1 is a isometric pictorial sketch of textile machinery, such as a warper, wherein this invention is employed.

Referring to FIGURE 1, there is shown a pictorial sketch of a warper 10 and its essential parts. The warper is employed to wind yarn 12 in a sheet upon a section beam 14 in preparation for sizing or knitting operations. The warper includes a V-shaped creel 16 onto which a large number of spools, cones, or bobbins or yarn sources 18 are mounted. A winding head 20 draws and warps sheets of yarn from the creel onto section beam 14.

The individual spools or bobbins are grouped into banks or rows on each side of the creel, as shown in FIGURE 1. Typically, each bank includes approximately 30 spools horizontally disposed along the length of the creel. The individual ends from the 30 spools are passed between weighted tension discs 22 and through guides. The ends are then drawn parallel to adjacent ends and wound on the section beam 14.

Apparatus for detecting yarn breakage and stopping the warper upon the detection thereof is provided in prior art devices, the detecting apparatus being installed at the front of the creel as indicated at 24. Study results show that a large number of yarn breaks occur near the cone. Consequently, the trailing end of the broken yarn travels or moves some distance before detection in the prior art devices. This problem becomes acute in high speed warpers; and operators spend considerable time rethreading the end along the length of the creel before making the splice.

Figure 2:
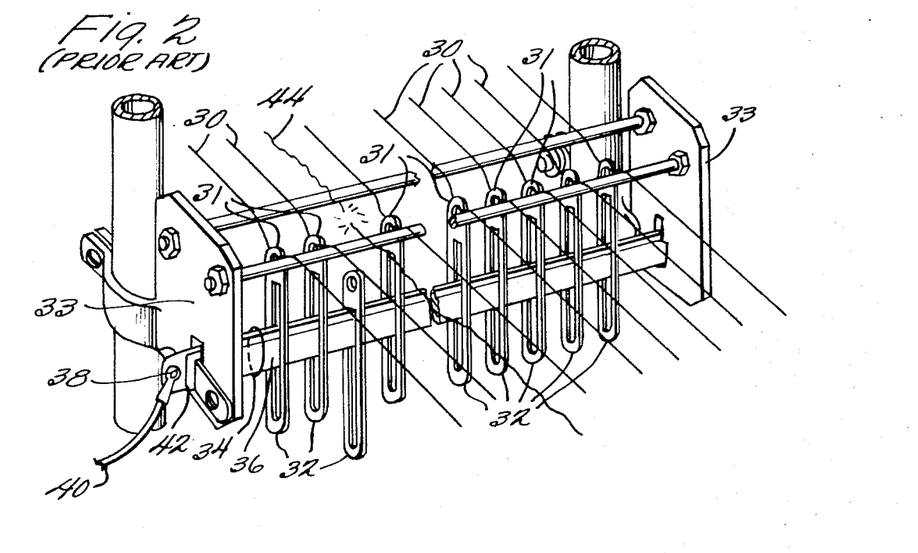
FIGURES 2, 3, and 4 illustrate various embodiments of the prior art.
Figure 3:
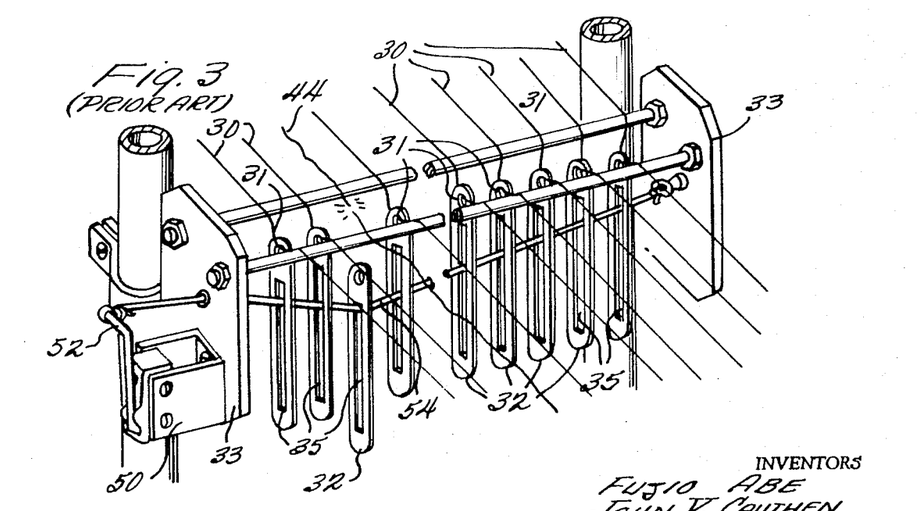
Figure 4:
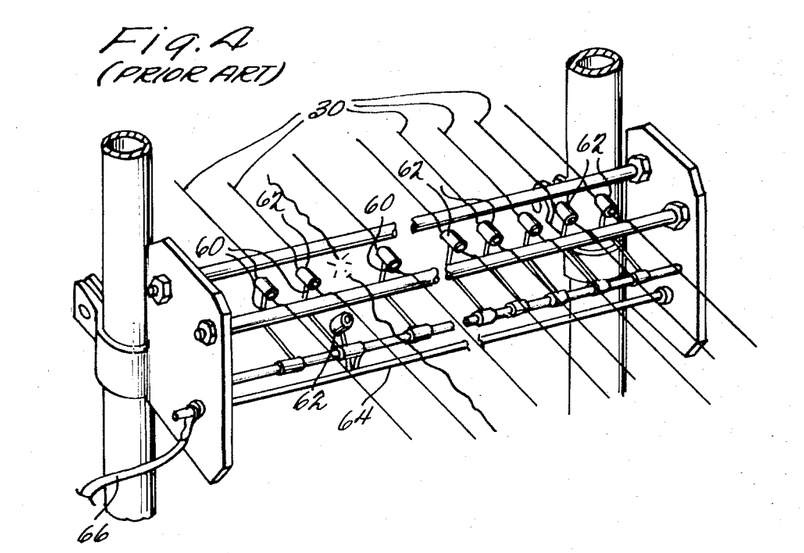

Referring to FIGURES 2, 3, and 4, there are illustrated various embodiments of the prior art. In FIGURE 2, each end or thread of yarn 30 is threaded through an opening or eye 31 of an associated drop wire 32. The drop wires are in electrical contact with the frame of the creel 16 and are maintained at ground potential. The drop wires are suspended above the electrode structure 34 which consists of a plate or rod 36 connected to the frame 33 of the creel 16 and maintained at ground potential. A further plate or electrode 38 is connected to the electrical circuitry for stopping the warper via lead 40. Plates 36 and 38 are electrically insulated from one another by insulation 42. Slackening of the yarn tension, such as by breakage of the yarn strand 44, causes the corresponding drop wire 32 to fall electrically connecting plate 36 to plate 38 and thereby completing the stop motion circuit to ground via lead 40.

FIGURE 3 is similar to FIGURE 2 in that the yarn 30 is threaded through drop wire 32 during normal operation via openings 31. However, in the embodiment of FIGURE 3, a switch 50 is mounted on the creel frame 33. The actuating lever 52 of this frame is connected to a Dacron line 54 which is threaded through the openings 35 in the drop wires as shown in FIGURE 3. When a strand of yarn such as strand 44 breaks, the corresponding drop wire falls, pulling the line 54 down and pulling the lever 52, thereby closing the switch 50 and completing the stop motion circuit.

FIGURE 4 illustrates a pivoting drop faller-type stop motion. The pivoting drop faller includes L-shaped faller rods 60 which are respectively associated with the strands of yarn 30. Each of the faller rods 60 includes a porcelain eyelet 62 at the end thereof through which the yarn 30 is threaded, thereby holding the faller arms 60 above electrode rod 64. A break in the yarn releases and causes the faller arm 60 to ground the electrode rod 64 which thereby completes the stop motion circuit via lead 66.

Figure 5:
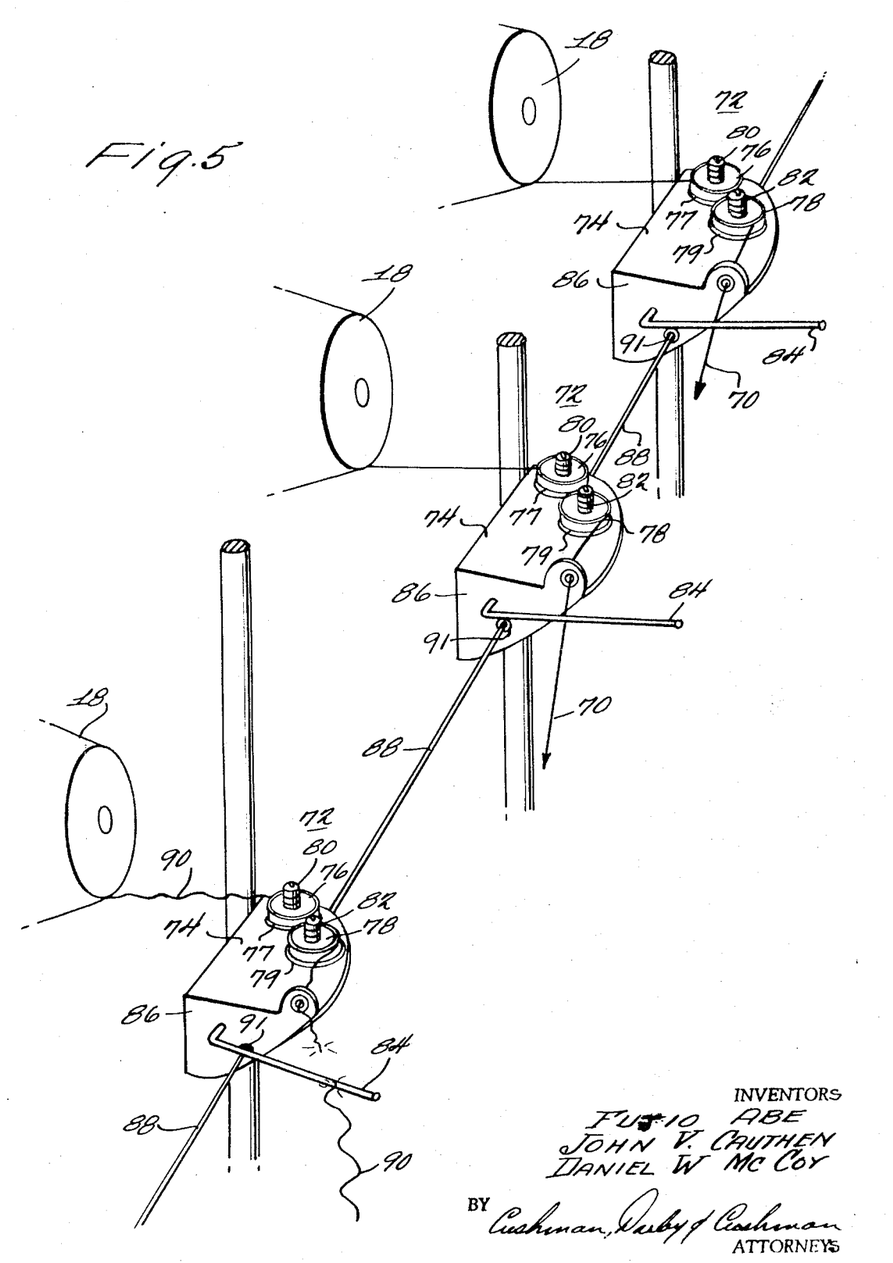
FIGURE 5 is an isometric pictorial sketch diagram illustrating one aspect of this invention—that is, illustrative means for detecting the tension in the strands of yarn.

Reference should now be made to FIGURE 5 which illustrates one aspect of the illustrative embodiment of this invention. There are shown a plurality of yarn sources or spools 18, each of said spools supplying a thread of yarn 70 to the textile machinery or warper. A tension assembly 72 is provided for each spool thereby providing uniform delivery of the yarn from each cone or spool to the warper section beam 14 and, further, minimizing the "back-up" of twist as the yarn leaves the cone or spool 18.

Each tension assembly 72 includes a horizontal plate 74. Mounted on top of the plate 74 is a first pair of discs 76 and 77 and a second pair of discs 78 and 79. A plurality of washers 80 and 82 respectively bias the upper discs 76 and 78 downwardly towards the lower discs 77 and 79. The yarn 70 passes between discs 76 and 77 and discs 78 and 79. The surfaces of the discs 76 through 79 in contact with the yarn 70 are highly polished. Due to the force applied to the yarn between the two discs by the weight of the upper discs 76 and 78 and the weighted washers 80 and 82, the yarn passing from the spool is free from tension irregularity. Also included with each of the tension assemblies 72 is a faller wire or first conducting member 84 which is pivotally mounted at each of the spools 18. The faller wire comprises an L-shaped wire one leg of which is pivotally mounted to plate 86 as shown in FIGURE 5. The other leg of wire 84 normally rests on top of the thread of yarn 70. The faller wire 84 is in electrical contact with the plate 86 and is thus maintained at the ground potential of the creel frame.

Provided below the yarn 70 is a single run or length of piano wire or second conducting member 88 which passes through each tension plate 86 and preferably extends the entire length of the creel. However, it would be obvious to one having ordinary skill in the art to have a single second conductor member 88 associated with each of the assemblies 72. The piano wire 88 is electrically insulated from the plates 86 by appropriate insulation 91. Preferably, the electrode wire 88 is connected to an electrode lead such as 40 or 66 at the front of the creel, see FIGURES 2 and 4 respectively. However, the electrode 88 may serve as a connection to the electrical circuitry for stopping the warper by many means which would be well known to those having ordinary skill in this art.

When a strand of yarn, such as 90, breaks, as shown in FIGURE 5, the faller wire 84, by gravity induction preferably, pivots about its axis and falls on and contacts the piano wire electrode 88. Thus, the action of the faller 84 on the piano electrode completes an electrical path to ground and stops the warper in a manner which will now be described in more detail.

Figure 6:
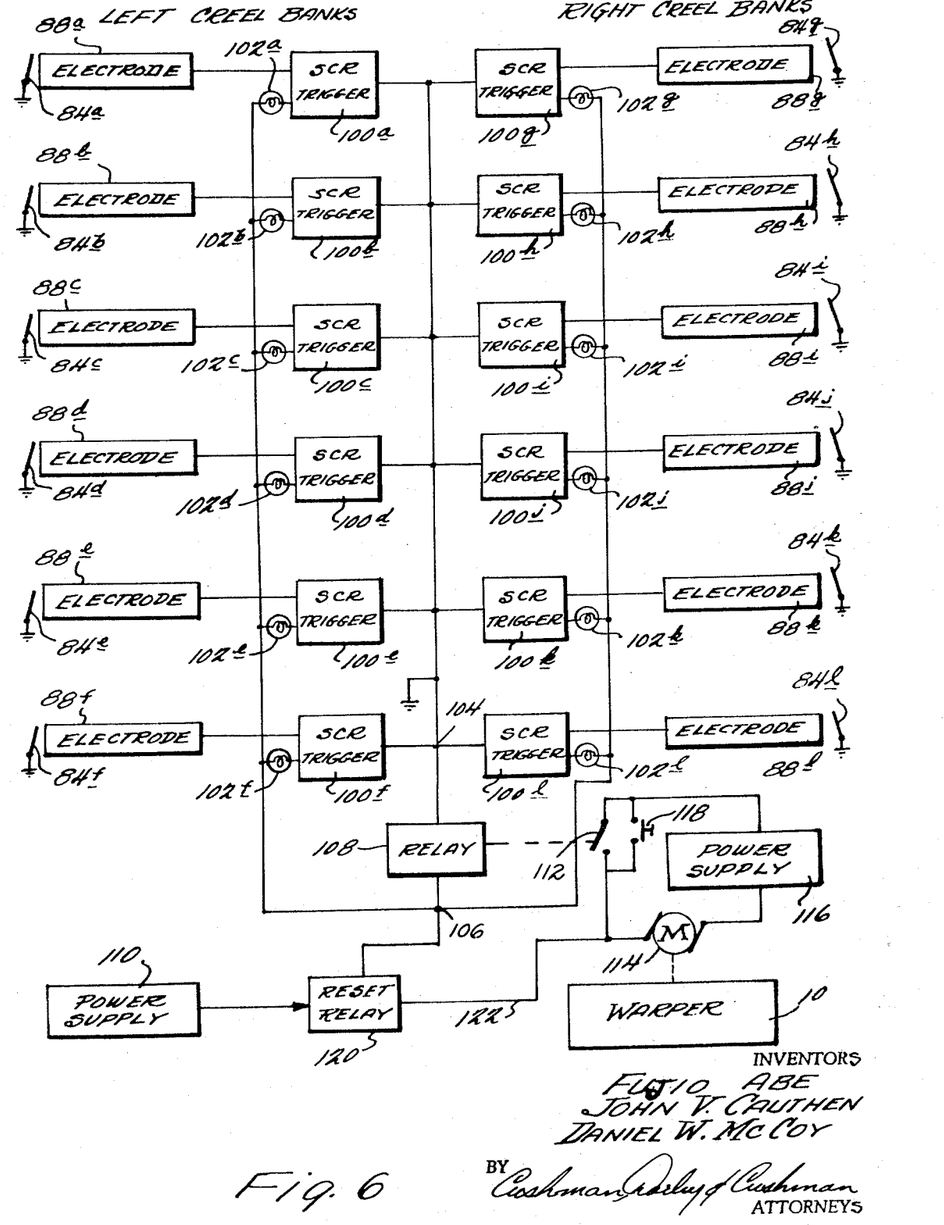
FIGURE 6 is a block diagram which illustrates the electric circuitry of an illustrative embodiment of the invention.

Reference should now be made to FIGURE 6 which is a block diagram of the electrical circuitry employed in this invention. There are provided a plurality of electrodes 88a through 88l, each of these electrodes corresponding to the piano wire electrodes 88 shown in FIGURE 5. Thus, the circuitry in FIGURE 5 is designed to handle a creel having twelve banks or rows of spools. Corresponding to the electrodes 88a through 88l are twelve SCR triggers or switching means 100a through 100l respectively. Each of the SCR's is capable of existing in two states of equilibrium, the first state corresponding to the detection of a yarn break and the second state corresponding to normal operation of the warper.

Associated with each of the SCR's 100a through 100l are lights 102a through 102l which are turned on in response to the detection of a yarn break by the respective SCR. Thus the lights 102a through 102l indicate within which bank the yarn break occurred.

The SCR's are connected in parallel between terminals 104 and 106. Upon energization of one of the SCR's, relay or first energizable switch 108 is energized from a power supply or first source of energy 110. The armature 112 of relay 108 is connected in circuit with the run or energizing motor 114 of the warper 10. Also included in this circuit is an appropriate power supply or source of electrical energy 116. When relay 108 is energized, the warper motor 114 is de-energized, thereby stopping warper 10.

After the broken thread of yarn has been located and repaired or spliced, start push button 118 is closed thereby reconnecting power supply 116 to motor 114 and restarting the warper 10. The push button 118 is a momentary contact type. However, it also closes a holding relay circuit (not shown) which maintains power supply 116 connected to motor 114 while 112 is open armature. The circuitry for restarting the warper is well known and since it forms no part of the present invention it will be described no further.

At the same time that warper 10 is restarted, the energized relay 108 is de-energized. This is accomplished by disconnecting the power supply 110 from relay 108 by second relay or energizable switch 120 which is energized from power supply 116 when push button 118 is momentarily closed as diagrammatically indicated at 122. As will be brought out in more detail hereinafter, the power supply 110 is removed from relay 108 for a predetermined time interval of one second, for example, thereby allowing sufficient time for the yarn 70 to be drawn under tension and thereby insuring that the faller wires 84 are lifted off the piano wire electrodes 88.

Figure 7:
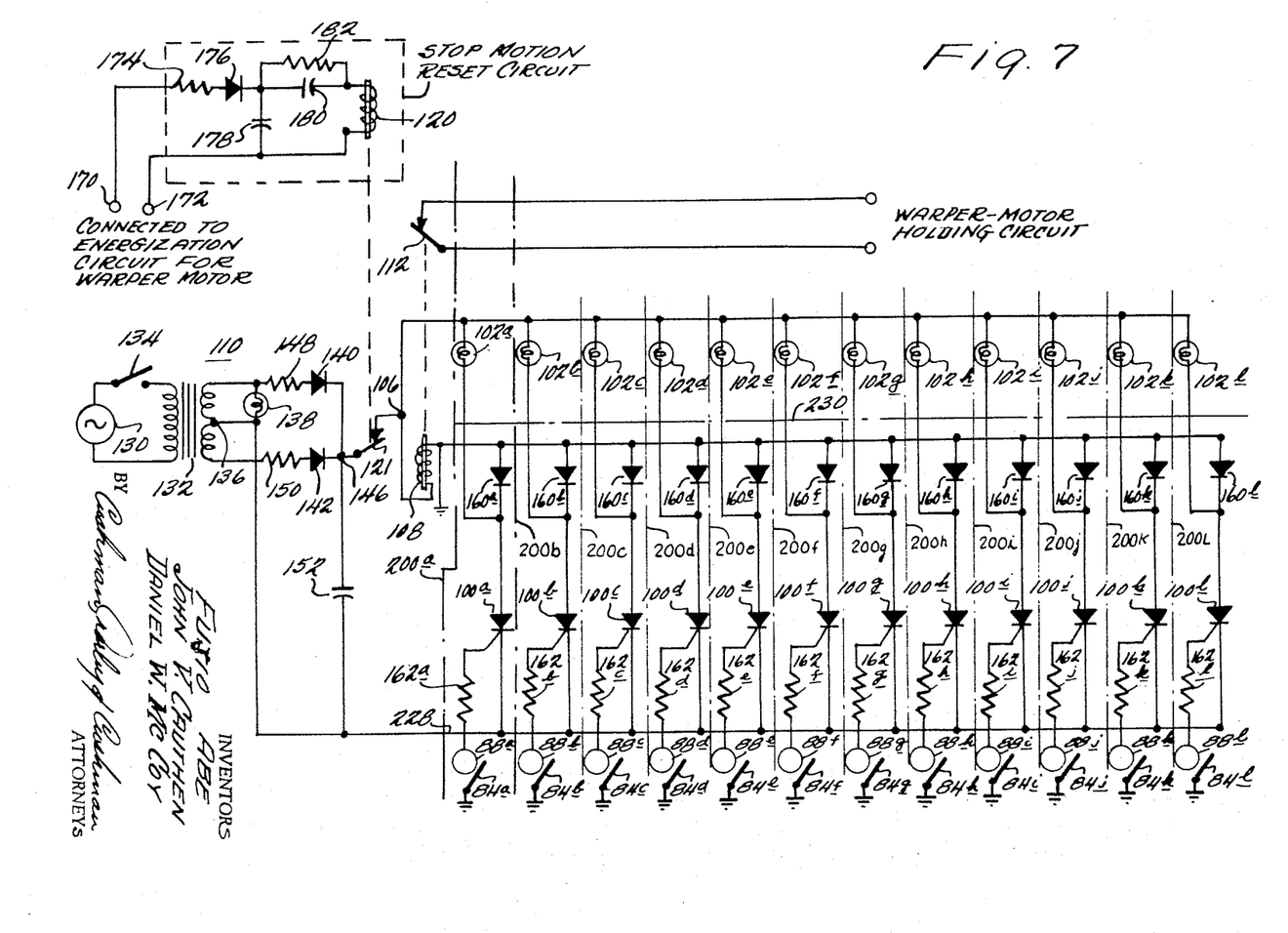
FIGURE 7 is detailed electrical schematic of the electrical circuitry illustrated in FIGURE 6.

Reference should now be made to FIGURE 7 which schematically illustrates in more detail the electrical circuitry described in FIGURE 6. The power supply 110 of FIGURE 6 comprises an AC source 130 connected to a main transformer 132 by main power switch 134. Source 130 is preferably 115 volts AC. Transformer 132 preferably steps down the 115 volts to 24 volts across the secondary thereof. The secondary is center tapped at 136. A pilot 138 is also provided. Diodes 140 and 142 provide full wave rectification, thereby resulting in 12 volts DC at terminal 146, resistors 148 and 150 provide surge protection. A filter capacitor 152 is also preferably provided. The SCR's 100a through 100l are connected in parallel, diodes 160a through 160l providing isolation between the anode terminals of the adjacent SCR's and thereby preventing interaction therebetween. Resistors 162a through 162l isolate the gates or control terminals of adjacent SCR's, thereby preventing interaction therebetween, the piano wires 88 being connected respectively to the resistors 162a and 162l. Lamps 102a through 102l are respectively connected between the anodes of the SCR's 100a through 100l and the terminal 106 which corresponds to one of the poles of relay 108. The opposite pole or terminal 104 of relay 108 is grounded to the creel frame together with the anodes of the diodes 160a through 160l.

The armature 121 is controlled by relay coil 120 which is energized from the circuitry which energizes the warper motor 114, see FIGURE 6. The connection to the energization circuit for the warper motor 114 is via terminals 170 and 172. A surge resistor 174 connects the AC current at terminals 170 and 172 to the rectifying circuit comprising diode 176 and capacitor 178. A time delay capacitor 180 and bleeder resistor 182 are provided to disconnect power supply 110 for a predetermined time interval from relay 108, thereby providing sufficient time for the faller wires 84 to be lifted off the electrodes 88, that is, relay coil 120 is immediately energized when the warper is restarted due to the voltage applied across terminals 170 and 172 thereby disconnecting power supply 110 from relay coil 108. However as voltage builds up across capacitor 180, the energizing voltage across coil 120 decreases. After a predetermined time interval—preferably one second—the voltage across coil 120 is insufficient to keep armature 121 open and it returns to its normally closed position thereby reconnecting supply 110 to relay 108.

Having described the structure of electrical circuitry required to accomplish the objects of this invention, the operation thereof will now be described. As shown in FIGURE 6, the electrodes 88a through 88l are respectively associated with faller wires 84a through 84l, the faller wires being grounded to the creel frames, see FIGURE 5. It should be appreciated that faller wires 84a shown in FIGURE 6 represents a plurality of wires as described with respect to FIGURE 5. Assuming that the strand of yarn associated with faller wire 84a breaks, the faller wire will contact electrode 88a, see FIGURE 5. Thus, an electrical circuit will be closed, energizing the SCR 100a.

Figure 8:
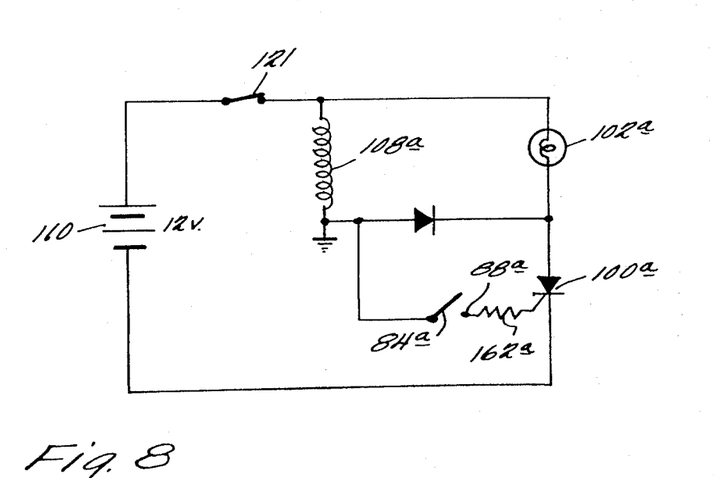
FIGURE 8 is a schematic diagram illustrating the activated portion of the circuitry when a yarn break occurs.

Referring to FIGURE 8, there is shown a schematic diagram of the equivalent circuit of the circuitry involved when SCR 100a is switched to its first state, thereby energizing coil 108, which, in turn, opens normally closed armature 112 to stop the warper motor. The SCR is basically a semi-conductor having three elements: a cathode, an anode, and a gate. The SCR, unlike rectifiers, will not conduct a substantial amount of current in a forward direction until the anode voltage exceeds a certain minimum voltage termed the forward break-over voltage. The value of this voltage can be controlled by the introduction of an external signal at the gate or control terminal. When the gate signal exceeds a given critical value, the voltage drop between the anode and cathode drops to a low value. Once triggered, the SCR remains in this state until the source voltage is removed from the anode.

Referring to FIGURE 8, switch 84a is closed as described hereinbefore upon yarn breakage or when the tension of the yarn decreases below some predetermined value. When this switch closes, the voltage at the positive terminal of source 110 is effectively placed on the gate of SCR 100a, thereby causing a gate to cathode voltage drop of 12 volts, which, in effect, increases the anode voltage above the forward break-over voltage, mentioned above. Thus, the SCR 100a is turned on. The voltage across the SCR is quickly reduced to a substantially small value with most of the 12 volts of the supply 110 now occurring across the coil 108a and the light 102a. Thus, armature 112 controlled by coil 108 is moved from its normally closed position to turn the warper motor off. Further, the light 102a is turned on to indicate that the bank of spools associated with piano wire electrode 88a contains the broken thread of yarn.

Referring to FIGURE 7, the remaining SCR's 100b through 100l are rendered immune to energization once the SCR 100a has been turned on. This results from the fact that most of the voltage drop occurs across relay coil 108 thereby reducing the voltage across the remaining SCR's to a point where the energization thereof is not possible.

Referring to FIGURE 8, when the warper motor is restarted after a repair, the switch 121 opens temporarily as stated hereinabove, while at the same time the faller wire 84a is disconnected from the electrode 88a. This follows since the warper operator will place the faller wire 84a on top of the spliced thread of yarn and the increasing tension in the yarn, after the warper starts running, will lift the faller wire 84 off of the electrode 88a. The energizing voltage from source 110 is removed from the anode and gate of the SCR 100a, thereby returning it to its second state of energization—that is, its normal state of equilibrium. Of course, with the de-energization of SCR 100a, indicator 102a also turns off. Also, coil 108a is de-energized and armature 112 is returned to its normally closed position.

In prior art arrangements, such as shown in FIGURES 2 through 4, the sensitivity of the electrical contact between the faller or drop wires and the electrode leading to the stop motion circuitry has been undesirably low. Since these connections operate in an area of high humidity and dust content, prolonged operation in this poor environment results in corrosion of the chrome plated drop wires of the prior art where frequent electrical contacts are made. Also, sparking and burning of the contact points accelerates the corrosion of these prior art arrangements, thereby causing a high resistance residue to accumulate.

This high resistance residue or accumulation has been overcome in the prior art devices by placing a high voltage, for instance 200 volts, across the drop wire circuit connections. This high voltage provides sufficient current to break through the normal build up in contact resistance. To eliminate this high voltage across the drop wire contacts, the SCR's 100a–100l are employed as detecting elements. The use of the SCR reduces the amount of current necessary to actuate the stop motion circuitry to 0.008 ampere. Further, sparking and burning of the faller wires 84 and the electrodes 88 has been practically obviated by eliminating the need for 200 volts across the drop or faller wire circuitry. As has beeen shown in detail hereinbefore, the 200 volts required in the prior art circuitry has been reduced to 12 volts, see FIGURE 7. The high resistance accumulation at the faller wire contacts has also been reduced because of the elimination of the sparking and burning. Hence, the sensitivity of the faller wires and electrodes remains relatively high and constant over a long period of time as compared with prior art drop and faller wire contacts.

Reference should now be made to FIG. 7 and, in particular, to dashed lines 200a through 200l. The purpose of these dashed lines is to indicate the preferred positioning of the circuit components shown in FIGURE 7 onto the warper shown in FIGURE 1. The circuitry to the left of line 200a is enclosed within a first container 202, see FIGURE 1. The circuitry between the lines 200a and 200b is disposed at the eye bar 208 located at the top right corner of the creel shown in FIGURE 1. The circuitry between lines 200b and 200c is located at eye bar 210, which is disposed directly below eye bar 204. The remaining circuits blocked out between lines 200c through 200l are disposed respectively at the eye bars 212 through 226. Thus, a physical arrangement of the circuitry is provided whereby ease of maintenance together with economy of fabrication is obtained.

An absolute minimum of wiring is employed in connecting the main control box 202 to the remaining peripheral circuitry located at the eye bars 204 through 226. Further, whenever one of the peripheral circuits located at the eye bars is in need of maintenance, it can be quickly replaced by a spare unit while the defective unit is repaired without any substantial down time of the warper.

As to other possible alternatives of the physical positioning of the electrical circuitry, it has been suggested that the circuitry disposed below the line 230 of FIGURE 7 and to the left of line 200a could be disposed at a single central unit while at the same time lamps 102a and 102l would be respectively disposed at the warper 204 through 226. By this arrangement it can be seen that the number of wires crossing the lines 200a and 230 is substantially increased, thus a large amount of wire would be necessary to connect the lamps to the central control unit if the central unit comprised the circuitry to the left of 200a and to the bottom of line 230. Further, if any of the SCR's were to fault, the whole central control unit would have to be removed while the necessary repairs were made thereby substantially decreasing the rate of production of the warper. Thus, it can be seen that the preferred embodiment described hereinbefore indeed results in a physical arrangement whereby ease of maintenance and economy of fabrication is obtained.

This invention can be used not only with warpers as has been described in the preceding descriptive material, but also may be used with other machinery employed in the textile industry. Thus, the invention can be installed on spinning frames, roving frames, and drawing frames where yarn-break stop motions are grouped for rapid yarn-break identification.

Still numerous other modifications of the invention will become apparent to one of ordinary skill in the art upon reading the foregoing disclosure. During such a reading, it will be evident that this invention has provided a unique apparatus for accomplishing the objects and advantages herein stated. It is to be understood, however, that the foregoing disclosure is to be considered exemplary and not limitative.

What is claimed is:

1. Apparatus for rapidly detecting and identifying an individual yarn break in textile machinery, including a warper and a creel, where a plurality of strands of yarn are simultaneously processed, the plurality of strands being respectively fed to the machinery from a plurality of sources of yarn in the creel, the plurality of strands being broken down into a smaller number of groups the apparatus comprising:

a plurality of detecting means respectively disposed adjacent the said plurality of yarn sources where yarn breaks are most likely to occur, each of said detecting means being responsive to a yarn break of the strand of yarn supplied by its associated yarn source; and a plurality of means located on said creel nearest to the warper for indicating the said group within which the said yarn break occurs, said indication being in response to said detection of said yarn break, thereby facilitating the location of said yarn break by the operator of said machinery.

2. Apparatus for stopping textile machinery, wherein the machinery includes a warper and a creel, where said machinery simultaneously processes a plurality of strands of yarn, the plurality of strands being respectively fed to the machine from a plurality of yarn sources in the creel, the plurality of yarn sources being arranged in at least one group for identification purposes, said apparatus comprising:

a plurality of detecting means respectively disposed adjacent the said plurality of yarn sources, each of said detecting means being responsive to the tension of the strand of yarn supplied by its associated yarn source;

a plurality of means respectively corresponding to said groups located on said creel nearest said warper for indicating the said group within which a yarn break occurs or the tension thereof decreases below a predetermined value, said indicating means being responsive to said detecting means, thereby facilitating the location of a yarn break by the operator of said machine; and means for stopping said machine in response to the detection of a yarn break or the decrease thereof below a predetermined value, thereby reducing the time necessary for the repair of a yarn break because the movement of the yarn is stopped at a point close to where yarn breaks usually occur.

3. Apparatus, as in claim 2, where said group corresponds to one of a plurality of rows or banks of yarn sources or spools disposed along the side of a creel and where said indicating means identifies the bank wherein said yarn break occurs.

4. Apparatus, as in claim 2 where each of said detecting means includes:

(1) switching means having a first and second state of equilibrium, said indicating means being energized and non-energized, respectively, in response to said first and second states, said switching means normally being in said second state; and (2) a plurality of means respectively disposed adjacent the plurality of yarn sources in said group, each of said last-mentioned means being responsive to the tension in the strand of yarn supplied from its associated yarn source for switching said switching means to said first state when the tension in said strand of yarn decreases below a predetermined value.

5. Apparatus, as in claim 4, where each of said means responsive to the said tension of said strand of yarn includes:

(1) a first conducting member maintained at a potential having a value sufficient to switch said switching means to said first state disposed at said yarn source, and (2) a second conducting member disposed at said yarn source connected to said switching means said first conducting member contacting said strand of yarn while the tension thereof remains above said predetermined value and contacting said second conducting member when said tension decreases below said predetermined value.

6. Apparatus, as in claim 5, where said first conducting member is a wire pivotally mounted at said associated yarn source, said wire being held above said strand of yarn as long as the tension in said yarn is above said predetermined value and said wire contacting said second conducting member whenever said strand of yarn breaks or whenever the tension thereof decreases below said predetermined value.

7. Apparatus, as in claim 6, where the movement of said wire from said strand to said second conducting member, when the yarn breaks or when the tension thereof decreases below said predetermined value, results from a gravity induced rotation of said wire about its pivot point.

8. Apparatus, as in claim 7, where said second conducting member includes an elongated wire, said wire being maintained in tension at a point below the strand of yarn.

9. Apparatus, as in claim 8, where said group corresponds to one of a plurality of banks or rows of yarn sources or spools disposed along the side of a creel, said second conducting member wire being associated with each yarn source of one of said banks thereby causing said bank to be identified and indicated whenever one of the strands of yarn associated therewith breaks or the tension thereof decreases below said predetermined value.

10. Apparatus, as in claim 5, where each said switching means includes a switching element having a control terminal for switching said switching means from said second state to said first state, said control terminal being responsive to said plurality of means responsive to the tension in said strand of yarn.

11. Apparatus, as in claim 10, where said switching means includes an anode and a cathode, together with said control terminal, said switching means remaining in said second state whenever the potential of said control terminal is different from the said value of potential on said first conducting member.

12. Apparatus, as in claim 11, including a plurality of said switching means connected in parallel so that when one of said switching means is switched to said first state, the potential at the anodes of said remaining switching means is below the predetermined value necessary to switch these remaining switching means to said first state.

13. Apparatus, as in claim 10, where said means for stopping the machine is in circuit with said switching means, said stopping means including a first energizable switch and a first source of electrical energy, said switching means connecting said first source of energy to said first energizable switch when said switching means is placed in said first state.

14. Apparatus, as in claim 13, where said energizable switch is an electromagnetic relay, the armature of which is circuit with the energizing motor of the said textile machinery.

15. Apparatus, as in claim 13, including means for delaying the connection of said first source of energy to said first energizable switch for a predetermined time after said yarn break has been repaired and said machine is restarted.

16. Apparatus as in claim 15, where said delaying means includes a second energizable switch which connects said first energy source to said first energizable switch, said second energizable switch being energized from the source which energizes the motor for the said textile machinery, the energization of said second energizable switch being delayed for said predetermined time interval by a reactive impedance element, said element being disposed between said energy source for the textile machinery motor and said second energizable switch.

17. Apparatus, as in claim 16, where said reactive element includes a capacitance which charges up after said predetermined interval of time to remove said machine motor energy source from said second energizable switch after said predetermined time interval has expired, thereby placing said first energy source in circuit with said first energizable switch.

18. Apparatus, as in claim 4, where said group corresponds to one of a plurality of banks or rows of yarn sources or spools disposed along the side of a structure such as a creel and where each of said switching means and said indicating means are disposed adjacent one of said banks.

19. Apparatus, as in claim 18, where said stopping means is located at a point substantially central to the said location of said switching means and said indicating means.

20. Apparatus, as in claim 4, where said switching means includes a silicon controlled rectifier (SCR) thereby increasing the sensitivity of said yarn tension-responsive means.

References Cited

UNITED STATES PATENTS

| | | | |
|---|---|---|---|
| 1,765,881 | 6/1930 | Reiners et al. | 28—51 |
| 2,405,218 | 8/1946 | Lambach et al. | 28—51 |
| 2,531,944 | 11/1950 | Metcalf | 139—353 |
| 2,696,608 | 12/1954 | Hangartner. | |

LOUIS K. RIMRODT, Primary Examiner

Disclaimer 3,456,310.—*Fujio Abe* and *John V. Cauthen*, Fayetteville, and *Daniel W. McCoy*, Monroe, N.C. APPARATUS FOR STOPPING TEXTILE MACHINERY UPON DETECTION OF YARN-BREAK AND FOR INDICATING LOCATION THEREOF. Patent dated July 22, 1969. Disclaimer filed Oct. 31, 1980, by the assignee, *Burlington Industries, Inc.*

Hereby enters this disclaimer to all claims of said patent.
[*Official Gazette September 7, 1982.*]